(12) United States Patent
Fesshaie

(10) Patent No.: US 10,480,960 B2
(45) Date of Patent: Nov. 19, 2019

(54) HOLLOW CORE MAGNETIC POSITION SENSOR

(71) Applicant: Littelfuse, Inc., Chicago, IL (US)

(72) Inventor: Efrem Fesshaie, Norwich (GB)

(73) Assignee: Littelfuse, Inc., Chicago, IL (US)

(*) Notice: Subject to any disclaimer, the term of this patent is extended or adjusted under 35 U.S.C. 154(b) by 24 days.

(21) Appl. No.: 15/829,251

(22) Filed: Dec. 1, 2017

(65) Prior Publication Data

US 2018/0156637 A1 Jun. 7, 2018

Related U.S. Application Data

(60) Provisional application No. 62/429,899, filed on Dec. 5, 2016.

(51) Int. Cl.
*G01D 5/20* (2006.01)

(52) U.S. Cl.
CPC .................. *G01D 5/2013* (2013.01)

(58) Field of Classification Search
CPC .. H02J 50/70; H02J 50/40; H02J 7/045; H02J 50/20; H01F 38/14; H01F 2003/005; H01F 27/42; H01F 41/048; H01L 2924/3025; H01L 23/53285; G01D 5/485; G01D 5/2013; G01N 15/1031; H01J 49/20; G01R 33/032; G01R 33/34084; G01R 33/3456; G01R 33/3806; G01R 33/5601; G01R 33/288; G01R 33/30; G01R 33/34; G01R 33/383; G01R 33/465; G01R 33/48; G01R 27/04; G01R 33/0354; G01R 33/307; G01R 33/3802; G01R 33/3815; G01R 33/448; G06F 3/013; G01L 21/12
See application file for complete search history.

(56) References Cited

U.S. PATENT DOCUMENTS

| | | | |
|---|---|---|---|
| 6,469,498 B1 | 10/2002 | Steinich | |
| 6,612,333 B2 * | 9/2003 | Miyazoe | F15B 13/0402 137/554 |
| 7,503,342 B2 * | 3/2009 | Piehl | F15B 13/044 137/554 |
| 7,548,057 B2 * | 6/2009 | Steinich | G01D 5/485 324/207.13 |
| 8,035,372 B2 | 10/2011 | Garneyer et al. | |
| 8,143,750 B2 * | 3/2012 | Aso | F16C 29/0685 310/12.19 |
| 9,182,459 B2 | 11/2015 | Kalathil et al. | |
| 9,479,031 B2 * | 10/2016 | Beste | G01D 5/485 |
| 9,752,896 B2 * | 9/2017 | Johnson | G01D 5/48 |
| 2004/0145377 A1 | 7/2004 | Sherrard et al. | |
| 2006/0145112 A1 | 7/2006 | Piehl et al. | |

(Continued)

FOREIGN PATENT DOCUMENTS

WO 2006058726 A1 6/2006

OTHER PUBLICATIONS

International Search Report for the International Patent Application No. PCT/US2017/064254, dated Feb. 14, 2018, 2 pages.

(Continued)

*Primary Examiner* — Vinh P Nguyen

(57) ABSTRACT

A position sensing system is disclosed. The position sensing system may include a hollow sensor body. A magnet may be disposed in the hollow sensor body. The magnet may be movable within the hollow sensor body.

14 Claims, 3 Drawing Sheets

(56) References Cited

U.S. PATENT DOCUMENTS

2011/0084559 A1* 4/2011 Finkbeiner ............ G01D 5/485
310/12.19
2015/0211888 A1 7/2015 Johnson

OTHER PUBLICATIONS

International Preliminary Report on Patentability for the International Patent Application No. PCT/US2017/064254, dated Jun. 20, 2019, 9 pages.

* cited by examiner

HOLLOW CORE MAGNETIC POSITION SENSOR

RELATED APPLICATIONS

This Application claims priority to U.S. provisional patent application 62/429,899, entitled HOLLOW CORE MAGNETIC POSITION SENSOR, filed Dec. 5, 2016, and incorporated by reference herein in its entirety.

BACKGROUND

Field

Embodiments of the present disclosure relate generally to waveguide based position sensors. More particularly, embodiments of the present disclosure related to waveguide based position sensors that include a moveable magnet used to sense position.

Description of Related Art

A conventional position measurement system may include a pulse generator and a signal receiver. The system further includes a waveguide sensor and a magnet. The magnet is external to the waveguide and generally positioned adjacent to the waveguide sensor. The magnet may be attached to a moveable object, which moveable object is also external to the waveguide sensor.

During operation, the pulse generator generates a pulse that is communicated to the waveguide sensor. The magnet creates an impedance discontinuity in a region of the waveguide sensor proximate to the magnet. A reflection of the pulse is reflected from the point of impedance discontinuity, resulting in a reflected pulse. The signal receiver receives the pulse and the reflected pulse. The position of the magnet relative to the waveguide sensor can be determined based on the timing of the pulse, such as a time delay, with respect to the reflected pulse. More specifically, the difference between the time the pulse is received and the time the reflected pulse is received can be used to determine the position of the magnet.

The conventional position measurement system, however, may be sensitive to ferrous material that is in the vicinity of the conventional position measurement system. More particularly, the presence of ferrous material in the vicinity of the conventional position measurement system may distort the magnetic field associated with the magnet. Furthermore, the conventional position measurement system may undesirably sense spurious magnetic fields that are not generated by the magnet. These distorted and spurious magnetic fields may affect the permeability and/or inductance of the waveguide sensor. Accordingly, the velocity of waves transmitted through the waveguide sensor may change, thereby changing the speed with which the pulse and the reflected pulse travel through the waveguide sensor. Correspondingly, the time of receipt of the reflected pulse may differ even when the point of discontinuity is the same. Therefore, the distorted and spurious magnetic fields may create nonlinearities in output signals of the conventional position measurement system. Accordingly, an improved position measurement system is needed.

Other problems with conventional position measurement systems will become apparent in view of the disclosure below.

SUMMARY

This Summary is provided to introduce a selection of concepts in a simplified form further described below in the Detailed Description. This Summary is not intended to identify key or essential features of the claimed subject matter, nor is this Summary intended as an aid in determining the scope of the claimed subject matter.

A position sensing system is disclosed. The position sensing system may include a hollow sensor body. A magnet may be disposed in the hollow sensor body. The magnet may be movable relative to the hollow sensor body.

In one implementation, a signal transceiver may be coupled to the hollow sensor body. The signal transceiver may generate a first signal communicated to the hollow sensor body. The signal transceiver may receive a second signal from the hollow sensor body. The first and second signals may be used to determine a position of the magnet relative to the hollow sensor body.

Furthermore, a position sensing method is disclosed. The method may include generating a first signal by a signal transceiver. The first signal may be communicated to a hollow sensor body. The method further may include moving a magnet in close proximity to the hollow sensor body and disposed within the hollow sensor body, where the magnet is configured to generate a magnetic field sufficient to locally saturate a magnetic material associated with the hollow sensor body, the magnetic material configured to cause an impedance discontinuity in the hollow sensor body such that the first signal is reflected as a reflected signal at the point of the impedance discontinuity. The reflected signal may be communicated to the signal transceiver. The method determines a position of the magnet based on the first signal and the reflected signal.

In a further embodiment, a position sensing system may include a pulsed waveguide, the pulsed waveguide comprising a hollow sensor body; the position sensing system may also include a magnet, disposed within the hollow sensor body, and movable within the hollow sensor body; and a signal transceiver, the signal transceiver operatively connected to the hollow sensor body, and configured to generate a signal pulse to the pulsed waveguide, and receive a reflected pulse based upon the signal pulse from the pulsed waveguide.

DETAILED DESCRIPTION

Figure 1:
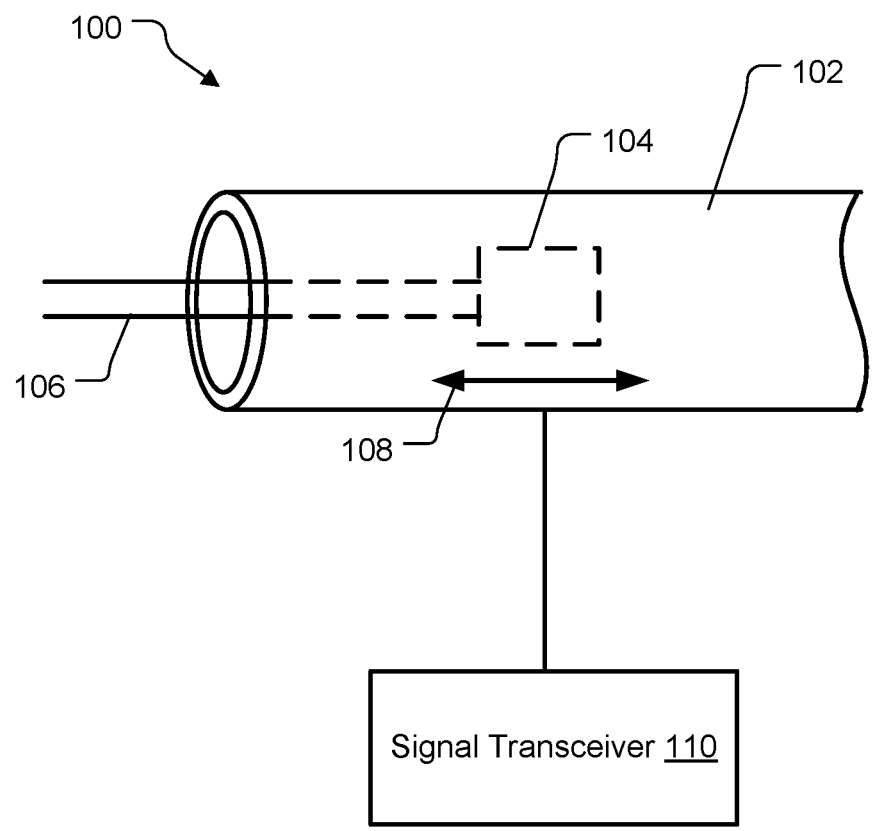
FIG. 1 is a schematic diagram illustrating a position sensing system, according to an embodiment of the disclosure.

Exemplary embodiments will now be described more fully hereinafter with reference to the accompanying drawings, in which embodiments are shown. The exemplary embodiments, however, may be embodied in many different forms and should not be construed as limited to the embodiments set forth herein. In the drawings, like numbers refer to like elements throughout.

FIG. 1 is a schematic diagram illustrating a position sensing system 100. The position sensing system 100 comprises a hollow sensor body 102. In general, the hollow sensor body 102 may be a waveguide. A magnet 104 may be disposed in the hollow sensor body 102. In one embodiment, the magnet 104 is movable within the hollow sensor body 102. In particular, the magnet 104 may be coupled to a rod 106. In one implementation, the magnet 104 is encapsulated within the rod 106. Therefore, the rod 106 may have a uniform outer diameter. The rod 106 may be actuated to move the magnet 104 along the interior length of the hollow sensor body 102, as illustrated by line 108. In another implementation, the magnet 104 is alternatively coupled to a liquid float, for example by way of encapsulation, to measure the position of a liquid level.

In general, the magnet 104 creates an impedance discontinuity in the hollow sensor body 102. The impedance discontinuity is created at the location of the magnet 104 relative to the hollow sensor body 102. As will be described in greater detail in the following, the location of the magnet 104 relative to the hollow sensor body 102 can be determined based on these impedance discontinuities.

In practice, the magnet 104 may be attached to a moveable object whose position is to be sensed. For example, in some embodiments, the magnet 104 can be affixed to a movable object (e.g., a piston rod, a welding tip, or the like). The hollow sensor body 102 can be affixed to a cooperating structure that may be placed along or in the path of the moveable object. In another example, the hollow sensor body 102 may be incorporated or integral with the cooperating structure.

In order to determine the location of the magnet 104 relative to the hollow sensor body 102, the position sensing system 100 includes a signal transceiver 110 that includes a position sensing processor. The signal transceiver 110 is operatively connected to the hollow sensor body 102 (e.g., via an electrical connection). The signal transceiver 110 is configured to generate a signal (e.g., signal pulses), which are communicated to and reflected (e.g., reflected signal) by the hollow sensor body 102. The signal transceiver 110 receives the signal pulses and the reflected pulses. The position sensing processor is operably connected to or integrated with the signal transceiver 110, and the position sensing processor is configured to determine the position of the magnet 104 relative to the hollow sensor body 102 based on the timing of the signal pulses and the reflected pulse received by the signal transceiver 110.

In some examples, the signal transceiver 110 may be configured to repeatedly (e.g., periodically, or the like) generate pulses. With some examples, the generated pulse may be a single pulse. With further examples, the generated pulse may be a series of pulses. The pulse is communicated to the hollow sensor body 102, which reflects the pulse (e.g., reflected pulse) due to the impedance discontinuity in the hollow sensor body 102 that is caused by the magnet 104. The reflected pulse is communicated from the hollow sensor body 102 to the signal transceiver 110. The time difference between incident and reflective pulses is a measure of the position of the magnet 104 in relation to the hollow sensor body 102. The position sensing processor associated with the signal transceiver 110 is configured to determine the location of the magnet 104 relative to the hollow sensor body 102 based on the timing of the incident and reflected pulses.

Figure 2:
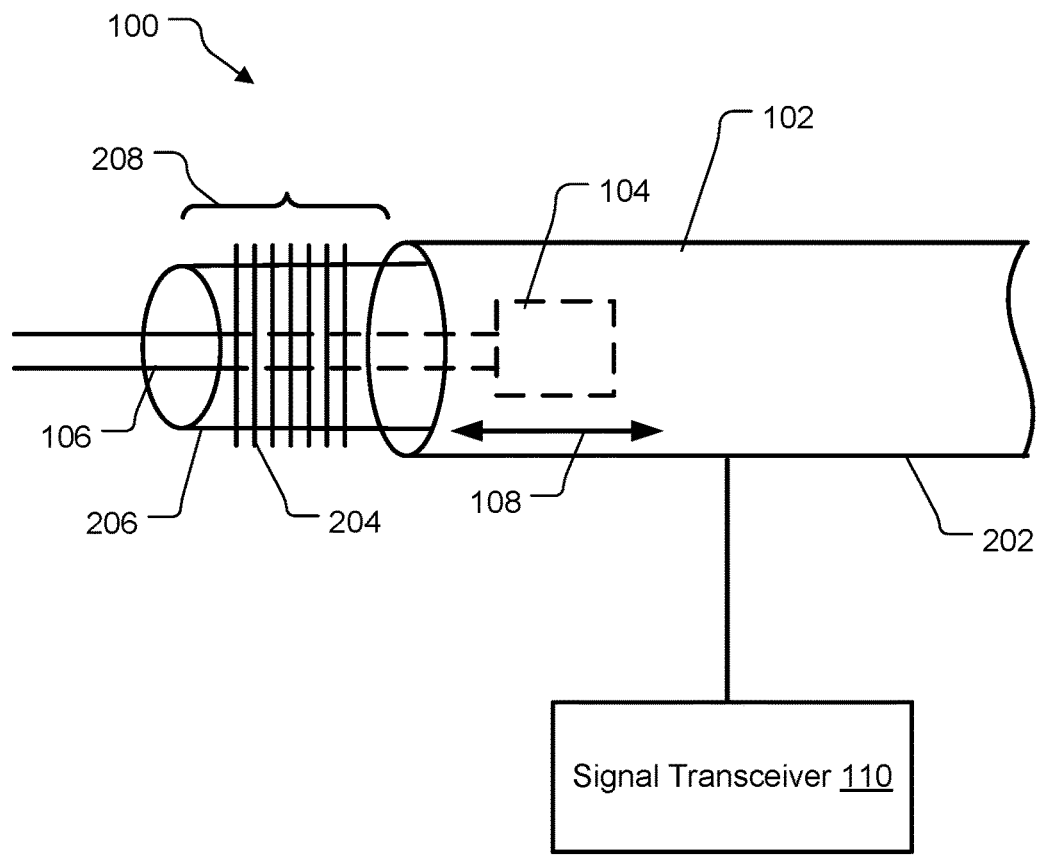
FIG. 2 is a schematic diagram illustrating another view of the position sensing system, according to an embodiment of the disclosure.

FIG. 2 is a schematic diagram illustrating another view of the position sensing system 100, with a portion 208 of an exterior shielding material 202 of the hollow sensor body 102 removed to expose a conductor 204. The conductor 204 may be wire or other electrically conducting metal. In another example, the conductor 204 may be a planar strip, such as a printed planar strip.

The exterior shielding material 202 may be made from a material having a magnetic permeability property. In one example, the exterior shielding material 202 is made from magnetic shielding material, such as permalloy material (e.g., Fe—Ni alloy). Use of the magnetic shielding material isolates the interior cavity of the hollow sensor body 102 from interference that may be caused by external magnetic fields. In another example, the exterior shielding material 202 is made of a conductive material (e.g., Cu).

In one implementation, the conductor 204, as is illustrated, is coiled around an exterior surface of a hollow core 206 in a spiral. The conductor 204 may act as a waveguide of the hollow sensor body 102. In one example, the hollow core 206 is made from a nonferrous material.

The conductor 204 may be coupled to the signal transceiver 110. Moreover, the conductor 204 may extend an entire length of the hollow core 206. In another example, one or more ferrite layers may surround the hollow core 206 such that the ferrite layers are positioned between the conductor 204 and the hollow core 206. Another ferrite layer may be positioned between the conductor 204 and the exterior shielding material 202. The one or more ferrite layers may function to provide inherent immunity from changing permeability of material around the position sensing system 100, for example ferrous material. The one or more ferrite layers may also provide additional functionality related to the position sensing system 100.

In one example, a sensing element or a plurality of sensing elements, such as hall sensors, magnetoresistive sensors, or the like, may replace the conductor 204. In another example, a thin-film layer including one or more sensing elements, such as Hall, Giant Magnetoresistance (GMR), or Anisotropic Magnetoresistance (AMR) sensors, may replace the conductor 204.

Figure 3:
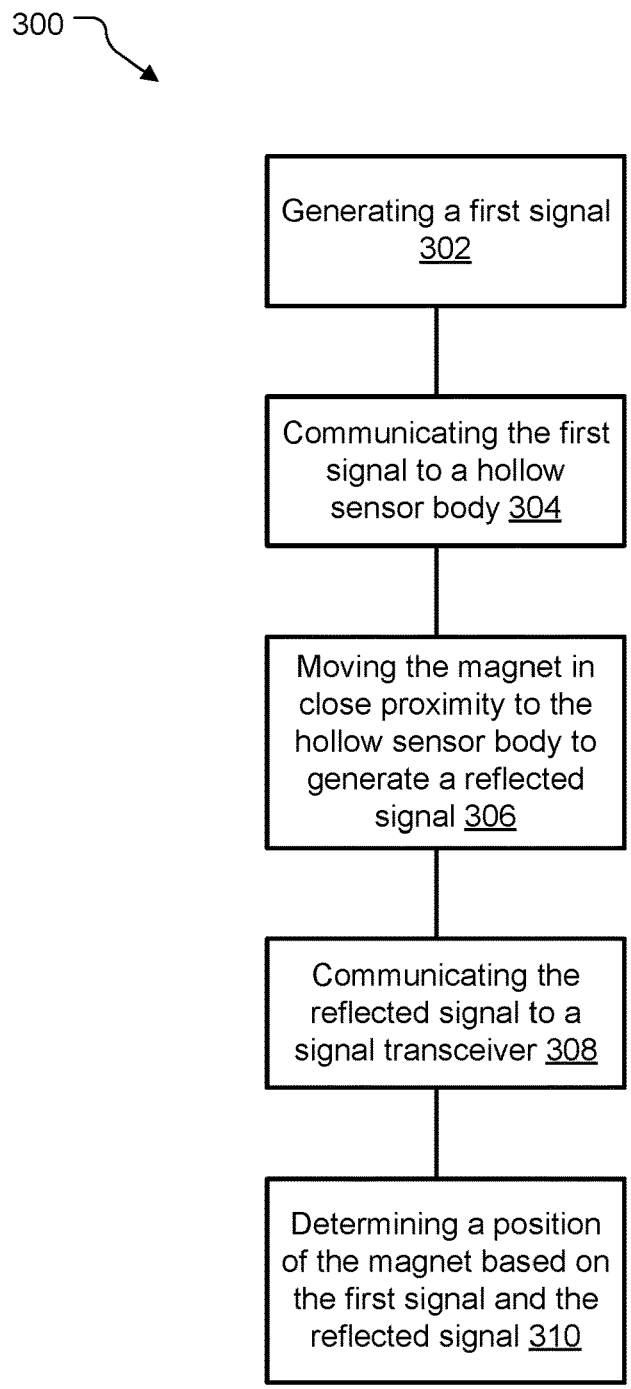
FIG. 3 flow diagram illustrating an exemplary method according to an embodiment of the disclosure.

FIG. 3 illustrates a method 300 according to an exemplary embodiment. The method 300 may be performed by the position sensing system 100. At block 302, a first signal is generated by a signal transceiver. At block 304, the first signal is communicated to a hollow sensor body. At block 306, the magnet positioned within the hollow sensor body is moved to generate a reflected signal. At block 308, the reflected signal is communicated to the signal transceiver. At block 310, a position of the magnet is determined based on the first signal and the reflected signal.

A number of advantages are realized by the design of the position sensing system 100. For example, the position sensing system 100 allows for the use of a smaller magnet compared to other position sensing systems that make use of a magnet that is exterior of the sensing element. In another example advantage, because the magnetic field generated by the magnet 104 are contained within the hollow core 206, distortion of the magnetic field is substantially eliminated. In yet another example advantage, because the position sensing system 100 allows for shielding against undesirable externally generated magnetic fields, output nonlinearities caused by such externally generated magnetic fields are greatly reduced.

While devices and methods associated with position sensing systems have been described with reference to certain embodiments, it will be understood by those skilled in the art that various changes may be made and equivalents may be substituted without departing from the spirit and scope of the claims of the application. Other modifications may be made to adapt a particular situation or material to the teachings disclosed above without departing from the scope of the claims. Therefore, the claims should not be construed as being limited to any one of the particular embodiments disclosed, but to any embodiments that fall within the scope of the claims.

I claim:

1. An apparatus, comprising:
   a hollow waveguide;
   a magnet disposed in the hollow waveguide;
   a rod disposed in the hollow waveguide and coupled directly to the magnet, wherein the rod is axially movable relative to the hollow waveguide for moving the magnet relative to the hollow waveguide; and
   a signal transceiver disposed outside of the hollow waveguide and coupled to the hollow waveguide, the signal transceiver to sense a magnetic field associated with the magnet.

2. The apparatus according to claim 1, wherein the hollow waveguide includes a hollow core, a conductor coupled to an exterior surface of the hollow core, and an exterior shielding material surrounding the conductor and the hollow core.

3. The apparatus according to claim 2, wherein the hollow core is a nonferrous material.

4. The apparatus according to claim 2, wherein the shielding material is a permalloy material.

5. The apparatus according to claim 2, wherein the shielding material is a material having a magnetic permeability property.

6. The apparatus according to claim 2, wherein the conductor is a wire wound around the hollow core, the conductor extending over an entire length of the hollow core.

7. The apparatus according to claim 2, wherein the shielding material is a conductive material.

8. A method, comprising:
   generating a first signal by a signal transceiver;
   communicating the first signal to a hollow waveguide;
   moving a magnet in close proximity to the hollow waveguide and disposed within the hollow waveguide, the magnet coupled directly to a rod that is disposed within, and that is axially moveable relative to, the hollow waveguide, the magnet configured to generate a magnetic field sufficient to locally saturate a magnetic material associated with the hollow waveguide, the magnetic material configured to cause an impedance discontinuity in the hollow waveguide such that the first signal is reflected as a reflected signal at a location of the impedance discontinuity;
   communicating the reflected signal to the signal transceiver, the signal transceiver disposed outside of the hollow waveguide; and
   determining a position of the magnet based on the first signal and the reflected signal.

9. The method according to claim 8, wherein determining the position of the magnet comprises:
   measuring a time delay between the generation of the first signal and a receipt of the reflected signal; and
   correlating the time delay with the position of the magnet.

10. A position sensing system, comprising:
    a hollow pulsed waveguide;
    a magnet disposed within the hollow pulsed waveguide;
    a rod disposed within the hollow pulsed waveguide and coupled directly to the magnet, wherein the rod is axially movable relative to the hollow pulsed waveguide for moving the magnet relative to the hollow pulsed waveguide; and
    a signal transceiver, the signal transceiver disposed outside of and operatively connected to the hollow pulsed waveguide, and configured to generate a signal pulse to the hollow pulsed waveguide, and receive a reflected pulse based upon the signal pulse from the hollow pulsed waveguide.

11. The position sensing system of claim 10, further comprising a position sensing processor, operably connected to or integrated with the signal transceiver, and being configured to determine a position of the magnet relative to the hollow sensor body based on timing of the signal pulse and the reflected pulse received by the signal transceiver.

12. The position sensing system of claim 10, wherein the hollow pulsed waveguide includes a hollow core, a conductor coupled to an exterior surface of the hollow core, and an exterior shielding material surrounding the conductor and the hollow core.

13. The position sensing system of claim 12, wherein the hollow core is a nonferrous material.

14. The position sensing system of claim 12, wherein the shielding material is a permalloy material.

* * * * *